(12) United States Patent
O'Rourke (10) Patent No.: US 11,358,708 B2
(45) Date of Patent: Jun. 14, 2022

(54) APPARATUS, AIRCRAFT AND METHOD FOR MOVING A WING TIP DEVICE AWAY FROM A LOAD-ALLEVIATING CONFIGURATION

(71) Applicant: Airbus Operations Limited, Bristol (GB)

(72) Inventor: Ciaran O'Rourke, Bristol (GB)

(73) Assignee: Airbus Operations Limited, Bristol (GB)

( * ) Notice: Subject to any disclaimer, the term of this patent is extended or adjusted under 35 U.S.C. 154(b) by 413 days.

(21) Appl. No.: 16/666,685

(22) Filed: Oct. 29, 2019

(65) Prior Publication Data
US 2020/0130816 A1 Apr. 30, 2020

(30) Foreign Application Priority Data
Oct. 29, 2018 (GB) ...................................... 1817650

(51) Int. Cl.
*B64C 23/06* (2006.01)
*B64C 5/08* (2006.01)
*B64C 21/08* (2006.01)

(52) U.S. Cl.
CPC ............... *B64C 23/076* (2017.05); *B64C 5/08* (2013.01); *B64C 21/08* (2013.01)

(58) Field of Classification Search
CPC ......... B64C 23/076; B64C 5/08; B64C 21/08; B64C 2003/543; B64C 3/546; B64C 9/146; B64C 23/072; B64C 3/38; B64C 21/02; B64C 23/065; Y02T 50/10; Y02T 50/40
See application file for complete search history.

(56) References Cited

U.S. PATENT DOCUMENTS

| 5,988,563 | A | 11/1999 | Allen | |
| 11,214,353 | B2 * | 1/2022 | Dege | ........................ B64C 3/56 |
| 2004/0155157 | A1 | 8/2004 | Bray | |

(Continued)

FOREIGN PATENT DOCUMENTS

| EP | 2 549 097 | 1/2013 |
| FR | 2 948 628 | 2/2011 |
| WO | 2017/118832 | 7/2017 |

OTHER PUBLICATIONS

European Search Report cited in EP19199557.0 dated Dec. 6, 2019, 13 pages.

(Continued)

*Primary Examiner* — Valentina Xavier
(74) *Attorney, Agent, or Firm* — Nixon & Vanderhye P.C.

(57) ABSTRACT

An aircraft (1) including a fixed wing (7) and a wing tip device (9) moveably mounted thereon. The wing tip device (9) is movable from a load-alleviating configuration to a flight configuration. The wing tip device includes an airflow channel (88) extending between respective apertures (83, 84) on the upper surface and lower surface of the wing tip device. The channel (88) is configurable between an open state in which air can flow through the channel and a closed state in which the airflow through the channel (88), via the apertures (83, 84), is blocked. The channel (88) is configured such that when the wing tip device (9) is in the load-alleviating configuration and the channel (88) is in the open state, the aerodynamic loading on the wing tip device in flight urges the wing tip device towards the flight configuration.

15 Claims, 10 Drawing Sheets

(56) References Cited

U.S. PATENT DOCUMENTS

2010/0303634 A1  12/2010  Long
2013/0292508 A1  11/2013  Fox

OTHER PUBLICATIONS

Combined Search and Examination Report for GB1817650.3, dated Apr. 25, 2019, 6 pages.
Aeronautics, Spanwise Adaptive Wing, www.nasa.gov, 2017, 2 pages.
"North American XB-70 Valkyrie", Wikipedia, printed Oct. 28, 2019, 14 pages.

* cited by examiner

APPARATUS, AIRCRAFT AND METHOD FOR MOVING A WING TIP DEVICE AWAY FROM A LOAD-ALLEVIATING CONFIGURATION

RELATED APPLICATION

This application claims priority to United Kingdom Patent Application GB 1817650.3 filed Oct. 29, 2018, the entirety of which application is incorporated by reference.

The present disclosure relates to aircraft with moveable wing tip devices, and methods of moving a wing tip device.

Embodiments of the present invention concern aircraft with a fixed wing and a movable wing tip device at the tip thereof. More particularly, but not exclusively, embodiments of the invention concern aircraft comprising a movable wing tip device that is moveable from a load-alleviating configuration to a flight configuration. Embodiments of the invention also concern methods of moving a mounted wing tip device from the load-alleviating configuration to a flight configuration.

BACKGROUND OF THE INVENTION

Aircraft with moveable wing tip devices attached to fixed wings are known to those skilled in the art. The wing tip devices are typically used to allow load-alleviation during flight, for example, in the event of wind gusts. Typically, large loads cause the wing tip device to move from a flight configuration in which the wing tip device is effectively a continuation of the fixed wing portion to a load-alleviating configuration in which the load on the wing is reduced. Once the cause of the requirement to enter the load-alleviating configuration has passed, it is often desirable to move the wing tip device back into the flight configuration. This may be done using an actuator. Typically, the larger the force required, the larger and heavier the actuator.

An example of such an aircraft is disclosed in WO2017118832, which discloses a wing tip device that is moveably mounted about a hinge. The aircraft comprises a restraining assembly operable between a restraining mode in which the wing tip device is held in the flight configuration by a restraining force, and a releasing mode in which the restraining force is released such that the wing tip device is able to adopt the load-alleviating configuration. The aircraft may comprise a motor for actuating the wing tip device to a ground configuration for reducing the aircraft span, and also for actuating the wing tip device from the load-alleviating configuration back into the flight configuration once a high load condition has passed.

The present invention seeks to mitigate the above-mentioned problems. Alternatively or additionally, the present invention seeks to provide an improved apparatus and method for moving the wing tip device of an aircraft from a load-alleviating configuration to the flight configuration.

SUMMARY OF THE INVENTION

In accordance with a first aspect of the present invention, there is provided an aircraft comprising a wing, the wing having a fixed wing and a wing tip device moveably mounted thereon, wherein the wing tip device is movable from: (a) a load-alleviating configuration in which the wing tip device is oriented relative to the fixed wing such that at least one of the upper and lower surfaces of the wing tip device is positioned away from the corresponding surface of the fixed wing, to (b) a flight configuration in which the upper and lower surfaces of the wing tip device are continuations of the upper and lower surfaces of the fixed wing. The wing tip device comprises an airflow channel extending between respective apertures on the upper surface and lower surface of the wing tip device, and wherein the airflow channel is configurable between: an open state in which airflow through the channel from one of the upper or lower surface of the wing tip device to the other of the upper or lower surface of the wing tip device, via the apertures, is permitted; and a closed state in which the airflow through the channel, via the apertures, is blocked. The channel is configured such that when the wing tip device is in the load-alleviating configuration and the channel is in the open state, the aerodynamic loading on the wing tip device in flight urges the wing tip device towards the flight configuration.

By providing such an airflow channel, aspects of the present invention recognise that aerodynamic forces may be used to urge the wing tip device back into the flight configuration. This may enable the load capacity of an actuator (for returning the wing tip device to the flight configuration) to be reduced. This may even remove the need for the actuator all together. A reduction in load capacity or removal of an actuator, may enable significant weight and/or space savings.

The provision of an airflow channel as a way of changing the aerodynamic forces has been found especially beneficial. This is because providing an airflow channel between upper and lower surfaces of the wing tip device has been found to create sufficiently large changes to the overall aerodynamics to urge the wing tip device towards the flight configuration. It has been found that a deployable control surface alone (e.g. a spoiler) tends not to be able to create a sufficiently large aerodynamic effect to achieve this.

When the channel is in the closed state, the upper and lower surfaces of the wing tip device are preferably substantially continuous. The apertures are preferably closed. When the channel is in the closed state, the aerodynamic loading on the wing tip device in flight is preferably urging the wing tip device away from the flight configuration. When the channel is in the closed state, and the wing tip device is in the load-alleviating configuration, the aerodynamic loading on the wing tip device in flight is preferably not urging the wing tip device towards the flight configuration.

The channel may be configured such that in the open state, the airflow flows through the channel from the lower surface of the wing tip device to the upper surface of the wing tip device. The aperture on the upper surface may be downstream of the aperture on the lower surface. Such an arrangement has been found to be beneficial because it tends to switch how the airflow over the upper and lower surfaces of the wing tip device behaves. For example, it may enable faster flow over the lower surface and slower flow over the upper surface (in comparison to the channel in the closed state), thereby enabling the net aerodynamic loading on the wing tip device to be reversed.

The airflow channel may comprise an interior wall, to create a conduit extending between the apertures. The interior wall may be shaped such that when the channel is in the open state, the aerodynamic loading on the wing tip device in flight, urges the wing tip device towards the flight configuration.

The interior wall may be contoured to create a relatively low pressure airflow flow through the channel compared to a relatively high pressure airflow over the upper surface of the wing tip device. The interior wall may, for example, be curved in a manner to create low pressure low through the channel.

The channel may separate the wing tip device into a forward portion, upstream of the channel, and a rearward portion downstream of the channel. It will be appreciated that the portions may be separated by the channel along a section (for example a chordwise section) through the wing tip device, rather than necessarily along the full length. The channel may be configured such that when the wing tip device is in the load-alleviating configuration and the channel is in the open state, the airflow around the forward portion in flight, creates a net aerodynamic force urging the wing tip device towards the flight configuration. In some embodiments, the airflow around the forward portion may have the opposing pressure distribution to the airflow around at least part of the wing tip device when the channel is in the closed state. For example, when the channel is in the open state the airflow over the lower surface and within the channel may be relatively low pressure and the airflow over the upper surface and may be relatively high pressure. The channel may be curved such that the rear face of the front portion is convex. By arranging this as a convex surface, the rear face of the front portion may act as an effective upper surface of an aerofoil, whereas the upper surface of the wing tip device may switch to acting as an effective lower surface of that aerofoil.

The wing tip device may further comprises a first door and a second door. Each door may be operable to selectively open or close a respective aperture on the upper or lower surface of the wing tip device, to switch the channel between the open and closed states. In principle, the doors may be moveable in a number of different ways. In some embodiments, the doors are hinged to rotate to open and close the aperture. The doors may hinge inwards into the channel. In other embodiments the doors may move in other ways, such as being slideable to block/expose the aperture.

The wing tip device may further comprise a deployable spoiler for deploying when the channel is in the open state. The spoiler is preferably arranged to complement the aerodynamics such that when the wing tip device is in the load-alleviating configuration, the channel is in the open state and the spoiler is deployed, the aerodynamic loading on the wing tip device in flight, urges the wing tip device towards the flight configuration.

When the channel is in the open state, the net aerodynamic force acting on the wing tip device may be any orientation that urges the wing tip device towards the flight configuration. In all cases however, the aerodynamic loading on the wing tip device in flight preferably creates a bending moment about the hinge, thereby urging the wing tip device to rotate towards the flight configuration.

The channel is preferably of fixed dimensions. The apertures in the upper and lower surfaces of the wing tip device are located between the leading edge of the wing tip device and the trailing edge of the wing tip device.

The wing tip device may comprise a single channel. The wing tip device may comprise a plurality, or a multiplicity, of channels, each having respective apertures on the upper and lower surfaces. The provision of multiple channels may be beneficial in controlling the aerodynamic forces to urge the wing tip device back to the flight configuration.

The wing tip device may be rotatably mounted on a hinge at the tip of the wing, such that it may rotate, about the hinge, between the flight and load-alleviating configurations. In embodiments in which the wing tip device is also moveable to a ground configuration (a configuration to which the wing tip device may be moved when the aircraft is on the ground), the wing tip device is preferably so moveable about this same hinge.

The hinge is preferably orientated non-parallel to the line-of flight direction. The hinge is preferably orientated such that the hinge at the trailing edge of the wing is further inboard than the hinge at the leading edge of the wing. The hinge is preferably orientated such that in the load-alleviating configuration, the mean incidence of the wing tip device is reduced. The hinge is preferably orientated substantially perpendicular to the swept mean chord axis of the wing. The swept mean chord axis may be parallel to the longitudinal direction of the wing box. Such an arrangement has been found to be beneficial in terms of enabling a load reduction (in comparison with a hinge line that is orientated parallel to the line-of flight). Furthermore, such an orientation of hinge has been found to facilitate movement of the wing tip device to a stable load-alleviating configuration (when the channel is in the closed state). For example, when the hinge is in such an orientation, the wing tip device tends to move to a static-aeroelastically stable position even under purely aerodynamic loading (when the channel is in the closed state). This orientation of hinge is therefore especially beneficial in combination with the restraining assembly in embodiments of the invention. The orientation of the hinge may be chosen such that it acts to stabilise flutter.

The wing tip device may be rotatable, from the load-alleviating configuration to the flight configuration, in a downwards direction. The wing tip device may be rotatable, between the load-alleviating configuration and the flight configuration (i.e. rotatable from the load-alleviating configuration to the flight configuration, and from the flight configuration to the load-alleviating configuration. The wing tip device is preferably repeatably moveable between the two configurations.

An actuator may be coupled to the wing tip device to move the wing tip device from the load-alleviating configuration to the flight configuration in conjunction with the aerodynamic forces on the wing tip device when the channel is in the open state. The actuator may have a capacity of less than that required for moving the wing tip device when the channel is in the closed state. The actuator may be arranged to move the wing tip device from the flight configuration to the load-alleviating configuration. However, it is preferred that the actuator is configured so that it is not operable to move the wing tip device from the flight configuration to the load-alleviating configuration.

The aircraft may comprise a restraining assembly operable between a restraining mode in which the wing tip device is held in the flight configuration using a restraining force, and a releasing mode in which the restraining force on the wing tip device is released, such that the wing tip device is able to adopt the load-alleviating configuration. A restraining assembly actuator may be provided to control operation of the restraining assembly.

Once the restraining force on the wing tip device is released, the wing tip device is permitted to move according to the other forces applied to the wing tip device (e.g. aerodynamic forces resulting from flight). If the restraining force is removed, the wing tip device would typically move to the load-alleviating configuration, subject to other forces applied to the wing tip device as described below.

For example, the restraining assembly may comprise a brake, the operation of which is controlled by the restraining assembly actuator. The restraining assembly actuator will typically be used to release the brake on receipt of a suitable control signal, thereby removing the restraining force.

The apparatus may comprise a biasing member, arranged such that when the wing tip device is in the flight configuration, the biasing member exerts a biasing force to urge the wing tip device towards the load-alleviating configuration. Such an arrangement has been found to be beneficial because it tends to reduce the lag between the restraining assembly adopting the releasing mode, and the wing tip device actually moving to the load-alleviating configuration (the biasing force assisting the movement of the wing tip device into the load-alleviating configuration such that it is moved under the action of both the biasing force and aerodynamic forces). Having the restraining assembly in combination with this movable wing tip device may be referred to as a "semi-aeroelastic" arrangement). The biasing member may be elastically-deformable. The biasing member may comprise an actuator for urging the wing tip device into the load-alleviating configuration.

Having the biasing member may be beneficial in reducing flutter (for example, in increasing the speed at which flutter may occur).

When the restraining assembly is in the restraining mode, the biasing force is typically overcome by the restraining force. But, when the restraining assembly is in the releasing mode, the biasing force is typically sufficient to assist in moving the wing tip device into the load-alleviating configuration. In some embodiments, when the restraining assembly is in the releasing mode, the biasing force may be sufficient to move the wing tip device into the load-alleviating configuration. Such an arrangement provides reassurance that the wing tip device can move to the load-alleviating configuration, if needs be, even in the absence of aerodynamic forces acting on the wing tip device. Nevertheless, the wing tip device is more preferably arranged such that it may be moved from the flight configuration to the load-alleviating configuration, at least partially by aerodynamic forces acting on the wing tip device.

The biasing member may be able to be selectively disengaged from exerting the biasing force on the wing tip device. For example, the wing may comprise a clutch for selectively disengaging the biasing member from exerting the biasing force on the wing tip device. Such an arrangement has been found to be beneficial because it may enable the biasing member to be selectively disengaged to enable easier maintenance of the wing tip device.

The apparatus may comprise a damper arranged to damp movement of the wing tip device. Such an arrangement has been found to be beneficial, especially when the wing tip device is quickly moved to the load-alleviating configuration, as it tends to damp down transient, oscillatory, movements. A damper has also been found to be beneficial because it may mitigate aeroelastic instabilities such as flutter, and/or may limit cycle oscillations.

In other embodiments, the apparatus need not comprise any damper and/or biasing member. Indeed, in some embodiments the wing tip device may be entirely free to rotate when the restraining assembly is in the releasing mode (i.e. there may be substantially no other resistive forces acting to prevent rotation once the restraining force is removed). When the wing tip device is free to rotate in this manner, it may be referred to as 'coasting' or being arranged to 'coast'. For some embodiments of the invention, having such an arrangement have been found to be especially beneficial. In such embodiments, the centre of gravity of the wing tip device may be positioned such that no substantive shear loads are passed into the wing tip and to ensure the flutter speed is sufficiently high. Aspects of the present invention may be especially advantageous in embodiments in which there is no damper and/or biasing member because it may enable the wing tip device to more readily return to the flight configuration under the aerodynamic forces when the channel is in the open state.

The apparatus may comprise a latching arrangement for holding the wing tip device in the load-alleviating configuration. For example, the aircraft may comprise a ratchet and pawl configured to allow rotation of the wing tip device to the load-alleviating configuration, and to then hold it in that configuration unless or until it is to be reverted to the flight configuration. Such an arrangement may be especially beneficial in embodiments in which there is no biasing member and/or damper because it enables the wing tip device to be 'caught' in the load-alleviating configuration (for example, once it has moved under aeroelastic forces once the restraining assembly is in the releasing configuration). The latching arrangement may be controllable to latch and/or release the wing tip device.

The wing tip device may be a number of different forms. For example, the wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the inner wing and wing tip device.

When the wing tip device is in the load-alleviating configuration, the aircraft incorporating the wing, is still suitable for flight, but the wing tip device is preferably moved to a position in which the lift provided by the wing is reduced. It will be appreciated that the load-alleviating configuration may encompass the wing tip device being in a range of positions (all of which reduce lift to some degree). The position (for example the magnitude of rotation about the hinge) may be dependent on the magnitude of load-alleviation that is sought. In the load-alleviating configuration the wing tip device remains attached to the fixed wing. The wing tip device may be repeatably moveable between the load-alleviating configuration and the flight configuration.

The wing tip device may also be moveable to a ground configuration for use on the ground and in which the span of the aircraft is reduced relative to the flight configuration. In the ground configuration, the span of the aircraft may be sufficient to meet an airport compatibility gate limit.

In embodiments in which the wing tip device is moveable to a ground configuration, the aircraft incorporating the wing, when the wing tip device is in the ground configuration, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration. In the ground configuration, the wing tip device may be rotated about the hinge by an angle greater than the maximum angle about which it is rotated in the load-alleviating configuration. In the ground configuration the wing tip device remains attached to the wing.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

Those skilled in the art will realise that typically the aircraft will be provided with a moveable wing tip at the end of each fixed wing portion.

The wingspan of the aircraft with the wing tip in the flight configuration is optionally no less than 52 m and optionally greater than 65 m. The wingspan of the aircraft with the wing tip in the lift-reducing or ground configuration is optionally no less than 52 m and no more than 65 m. The length of the wing tip device (measured along the longitudinal axis of the fixed wing portion) is optionally at least 1.0 m, optionally at least 1.5 m, optionally at least 2.0 m, optionally at least 2.5 m and optionally at least 3.0 m. The length of the wing tip device is optionally no more than 5.0 m, optionally no more than 4.5 m, optionally no more than 4.0 m, optionally no more than 3.5 m, optionally no more than 3.0 m and optionally no more than 2.5 m. The span ratio of the fixed wing relative to the wing tip device may be such that the fixed wing comprises 70%, 80%, 90%, or more, of the overall span of the aircraft wing.

Unless the context suggests otherwise, reference herein to orientations/directions will be understood to be relative, and refer to the orientations when the wing tip device is in the flight configuration. For example the upper and lower surfaces of the wing tip device are the upper and lower surfaces when the wing tip device is in the flight configuration (even where the wing tip device including those surfaces is subsequently rotated to the load-alleviating configuration). References to directions/orientations purely in the load-alleviating configuration, and dependent on the airflow direction may be made in a local reference from of the wing tip device (for example the upstream and downstream locations).

In accordance with another aspect of the invention, there is provided a wing for use as the wing of the aircraft of the first aspect.

In accordance with another aspect of the present invention, there is provided a wing tip device for use as the wing tip device on the aircraft of the first aspect. The wing tip device comprises an airflow channel extending between respective apertures on the upper surface and lower surface of the wing tip device, and wherein the wing tip device is configurable between: an open state in which airflow through the channel from one of the upper or lower surface of the wing tip device to the other of the upper or lower surface of the wing tip device, via the apertures, is permitted; and a closed state in which the airflow through the channel, via the apertures, is blocked. The channel is configured such that when the wing tip device is mounted on the tip of the fixed wing of the aircraft and the wing tip device is in the load-alleviating configuration and the channel is in the open state, the aerodynamic loading on the wing tip device in flight urges the wing tip device towards the flight configuration.

In accordance with another aspect of the present invention, there is provided a wing tip device for returning from a load-alleviating configuration to a flight configuration under the action of aerodynamic forces in flight, the wing tip device comprising a conduit extending between respective openings on its upper and lower surface, and conduit being configurable between: a closed state in which the openings are blocked to prevent airflow through the conduit, and an open state in which the openings are exposed such that air may flow through the conduit from the lower surface of the wing tip device to the upper surface of the wing tip device such that the aerodynamic loading on the wing tip device in flight urges the wing tip device towards the flight configuration.

In accordance with yet another aspect of the present invention, there is provided a method of returning a wing tip device from a load-alleviating configuration, to a flight configuration, wherein the method comprises the steps of configuring, when the wing tip device is in the load-alleviating configuration, the wing tip device from: a closed state in which the airflow through a channel extending between apertures on the upper surface and lower surface of the wing tip device, is blocked, and an open state in which airflow through the channel, via the apertures, is permitted, such that the aerodynamic loading on the wing tip device in flight urges the wing tip device towards the flight configuration.

It will of course be appreciated that features described in relation to one aspect of the present invention may be incorporated into other aspects of the present invention. For example, the method of an aspect of the invention may incorporate any of the features described with reference to the aircraft or the wing tip device of the other aspects of the invention and vice versa.

DESCRIPTION OF THE DRAWINGS

Embodiments of the present invention will now be described by way of example only with reference to the accompanying schematic drawings of which:

FIG. 1b shows a schematic plan view of part of a wing of the aircraft of FIG. 1a;

DETAILED DESCRIPTION

Figure 1A:
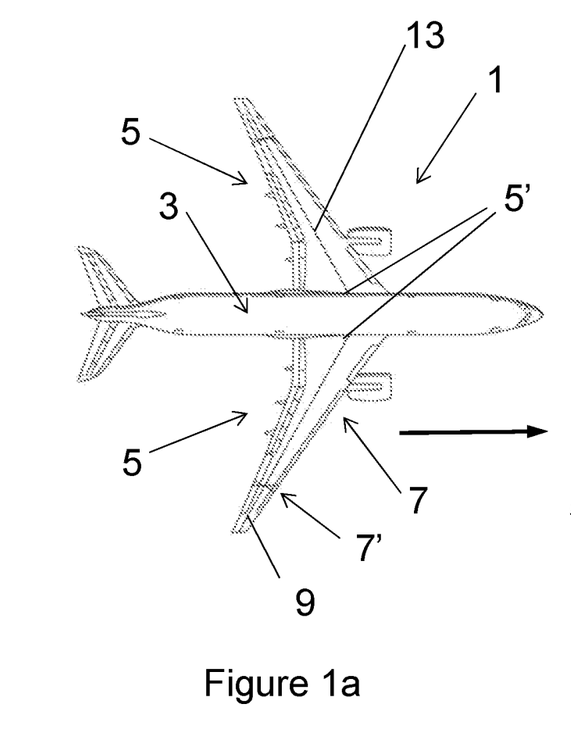
FIG. 1a shows a schematic plan view of an apparatus and aircraft according to a first embodiment of the invention.

FIG. 1a is a plan view of an aircraft 1 according to a first embodiment of the invention. The aircraft comprises a central fuselage 3 and two main wings 5 extending outwardly from respective wing roots 5'.

Figure 1B:
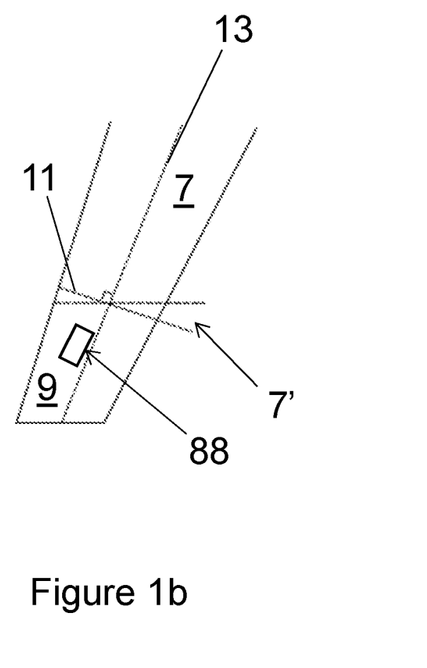

Each wing 5 comprises a fixed wing 7 extending from the root 5' to the tip 7' (shown in close up in FIG. 1b). At the tip 7' of the fixed wing 7, the wing 5 also comprises a moveable wing tip device 9, in the form of a planar wing tip extension. The wing tip device 9 is rotatably mounted about a hinge 11 that is orientated perpendicular to the swept mid-chord axis 13. This hinge 11, is thus non-parallel to the line of flight direction (the line of flight direction being shown in FIG. 1b for comparison).

Figure 4:
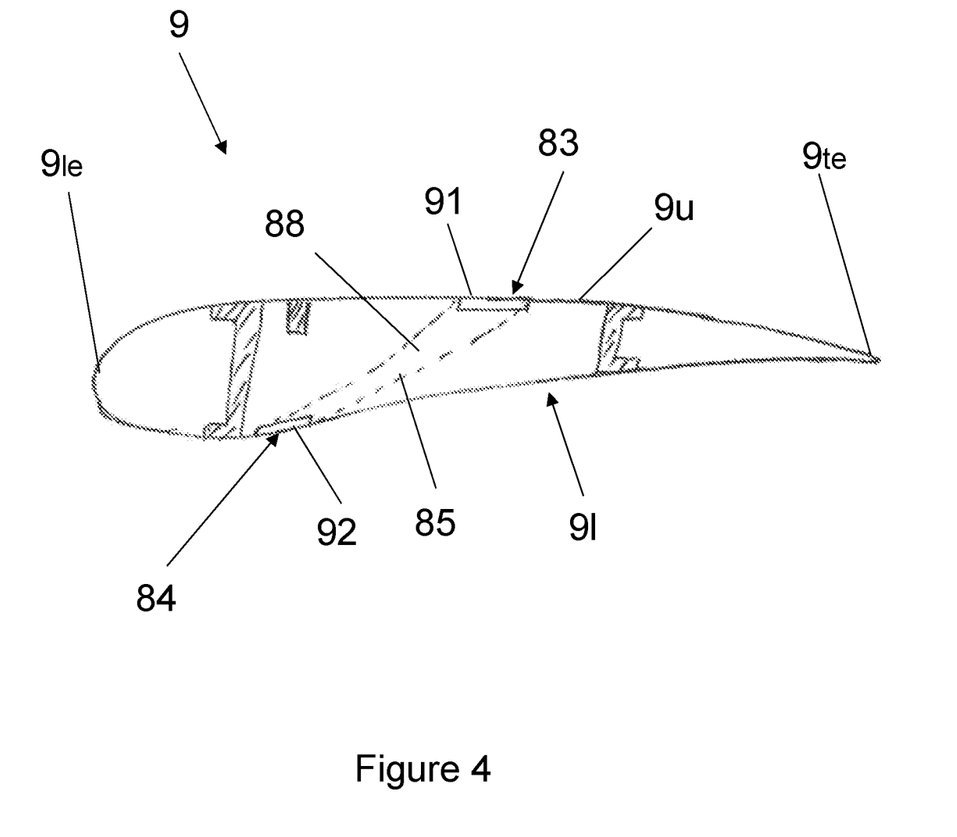
FIGS. 4 and 5 show a sectional view, through A-A in FIG. 3, showing the airflow channel in more detail, and in the closed and open sates respectively.

The wing tip device 9 also comprises an airflow channel 88 to which reference is made in more detail in FIG. 4 onwards.

Figure 2A:
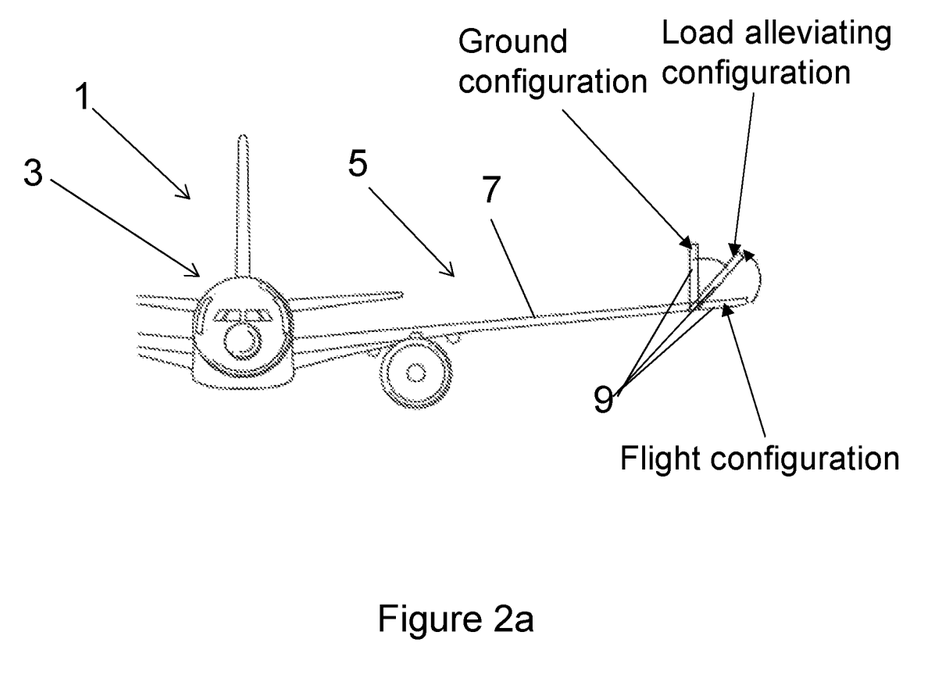
FIG. 2a shows schematic front view of the aircraft of FIGS. 1a and 1b.
Figure 2B:
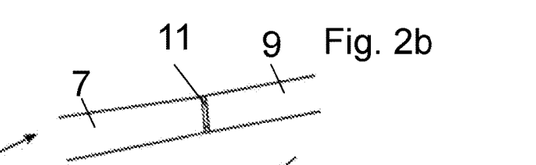
FIGS. 2b-d show a plan view of the aircraft of FIG. 2a with the wing tip device in respective close-up views.
Figure 2C:
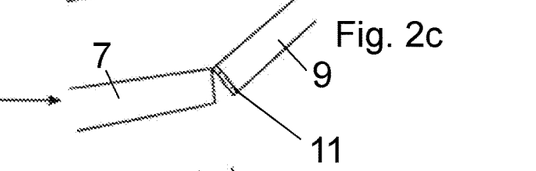

Referring now to FIGS. 2a-2c, the wing tip device 9 is rotatable about the hinge 11 from a flight configuration to a load-alleviating configuration, to a ground configuration.

In the flight configuration, the wing tip device 9 is an extension of the fixed wing. Accordingly the upper and lower surfaces of the fixed wing 7 are continuous with the upper and lower surfaces of the wing tip device 9. The leading and trailing edges of the fixed wing 7 are also continuous with the respective leading and trailing edges of the wing tip device 9 (see FIGS. 1a and 1b). Such an arrangement is beneficial as it provides a relatively large wing span, thereby providing an aerodynamically efficient aircraft. However a large span can result in correspondingly large loads on the wing 5, particularly a large wing root bending moment, especially during high load events such a gusts or extreme manoeuvres. The wing 5 must be sized to cope with these maximum loads, which can result in a relatively heavy wing. The ability of the wing tip device 9 to move to the load-alleviating configuration seeks to address that problem.

As shown in FIG. 2c and the middle position in FIG. 2a, the wing tip device 9 is rotatable, upwards, such that the lower surfaces between the fixed wing 7 and the wing tip device 9, are no longer continuous with one another. Furthermore, since the hinge 11 is angled with respect to the airstream-wise direction, when the wing tip device 9 rotates upwardly its mean incidence is reduced. In this configuration the lift generated by the wing 5 is significantly reduced and the load on the wing tip device is also significantly reduced. The wing tip device 9 is moveable to this configuration during flight.

Figure 2D:
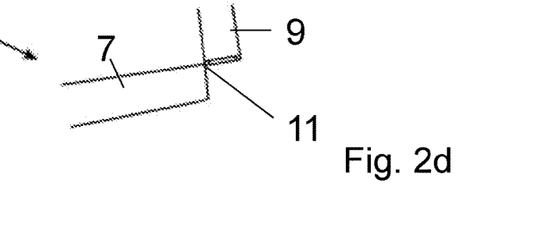

The wing tip device 9 is also configurable to a ground configuration in which the wing tip device 9 is rotated yet further, to a substantially upright position (shown in FIGS. 2a and 2d). The wing tip device is moveable to this configuration when it is on the ground (described in more detail below). Once rotated to such a position, the span of the aircraft 1 is sufficient to meet airport compatibility gate limits. Thus, the aircraft 1 of the first embodiment can have a large span (exceeding gate limits) during flight, but is still able to comply with gate limits when on the ground.

Figure 3:
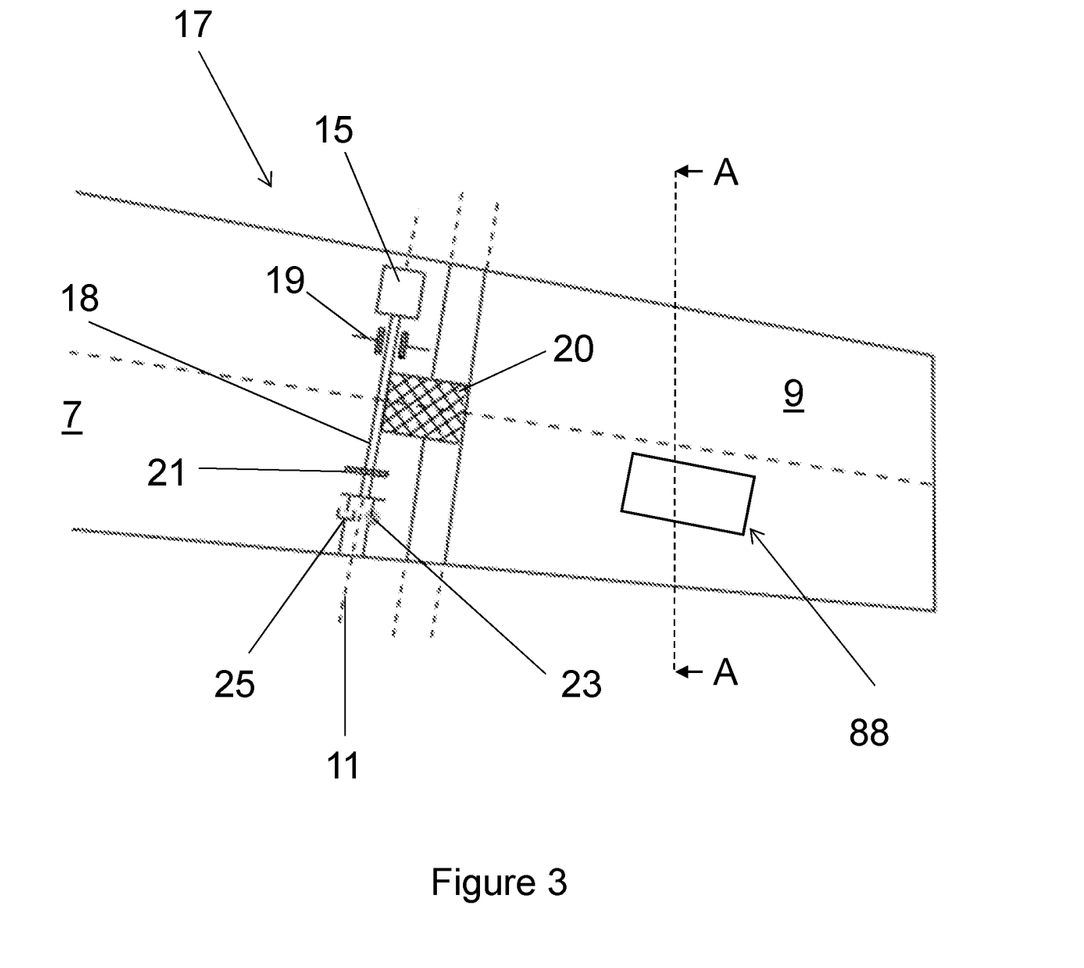
FIG. 3 shows a schematic plan view of the end portion of a wing of FIGS. 1-2d.

Referring to FIG. 3, the aircraft 1 comprises a motor 15 connected to a drive shaft 18 that forms the shaft of the hinge 11. The wing tip device 9 is connected to the shaft 18 by a connecting piece 20. The motor 15 is arranged to rotate the wing tip device 9 between the flight configuration and the ground configuration by actuation of the motor 15. This typically occurs shortly after landing to enable the aircraft to comply with airport gate limits. This movement also happens in reverse before take-off, once the aircraft has cleared the gate.

A restraining assembly 17 comprises a brake 19, a clutch 21, a rotational spring 23 and a rotational damper 25.

The brake 19 comprises two pads configured to selectively clamp against the shaft 18 to restrain its rotation. The restraining assembly 17 is operable between a restraining mode (in which the brake 19 is deployed to brake the rotation of the shaft 18), and a releasing mode (in which the brake 19 is released by pulling the pads away from the shaft 18 to allow its free rotation (and thus the rotation of the wing tip device 9)).

The default (passive) mode of the restraining assembly 17 is the restraining mode in which the shaft 18 is braked. When the wing tip device 9 is in the flight configuration, the power to the restraining assembly 17 is switched OFF (i.e. the assembly is passive) and the restraining assembly 17 is left with the shaft 18 braked.

During cruise flight, the restraining assembly 17 is OFF and the brake is braked onto the shaft 18. However, when the measurement from an alpha detector indicates an oncoming gust (i.e. a significant change in angle of attack) a control module (not shown) switches the restraining assembly ON, which releases the brake 19.

Such an arrangement enables the wing tip device 9 to be securely held in the flight configuration during normal cruise flight, but by switching the releasing assembly ON to release the brake 19, the wing tip device 9 is movable quickly to the load alleviating configuration. This means the wing can avoid being subjected to high gust loadings. This in turn may enable the wing 5 to have a relatively large span, without necessarily having to incur the associated weight penalty, because it can be designed for a lower magnitude of maximum load.

Load-alleviation using moveable wing tip devices is known per se. Providing moveable wing tip device to meet airport compatibility gate limits is also known per se, and in that respect, some of the above-mentioned features are disclosed in WO2017118832. It has been recognised that the aerodynamic loads on the wing tip device during flight, for example when returning back from the load-alleviating configuration, can be very high. Using a motor to return the wing tip device 9 to the flight configuration has been found to require a large capacity motor (which tends to also mean the motor has a correspondingly large weight and size).

In the first embodiment of the invention the motor 15 has a load capacity of less than that required for moving the wing tip device 9 back towards the flight configuration during flight. Instead, the first embodiment of the invention has recognised that an airflow channel 88 (described in more detail below) can be used to create an aerodynamic force that urges the wing tip device 9 back towards the flight configuration.

The airflow channel 88 will now be described in more detail with reference to FIGS. 4 to 6.

Figure 5:
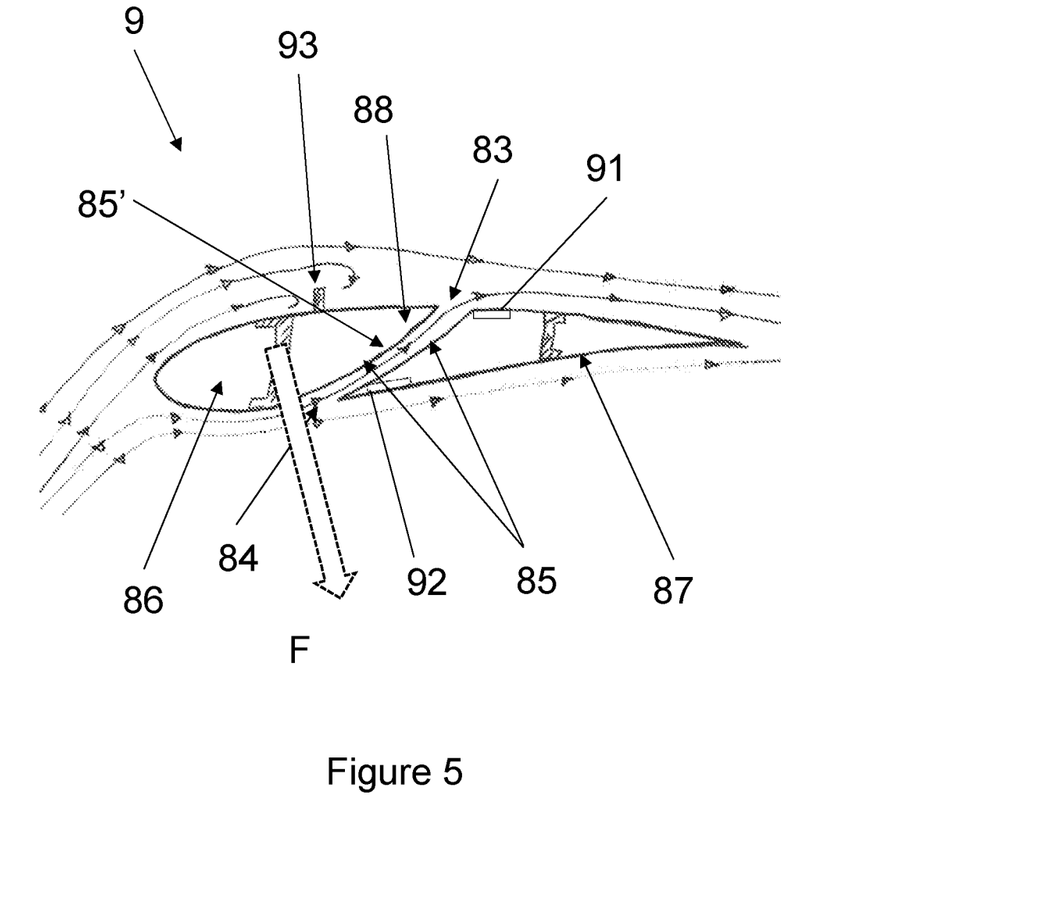

FIGS. 4 and 5 show a sectional view through the wing tip device along line A-A in FIG. 3. The wing tip device 9 of the first embodiment of the invention comprises an airflow channel 88 extending between an upper aperture 83 on the upper surface 9u of the wing tip device 9 and a lower aperture 84 on the lower surface 9l of the wing tip device 9. The upper aperture 83 is positioned downstream of the lower aperture 84. The airflow channel 88 through the wing tip device 9 is formed by a continuous interior wall 85 (shown in dashed lines in FIG. 4) defining a conduit extending between the upper aperture 83 and the lower aperture 84 to contain and direct airflow between the lower aperture 84 and the upper aperture 83.

As illustrated by comparing FIGS. 4 and 5, the airflow channel 88 is configurable between a closed state (FIG. 4) and an open state (FIG. 5).

In the closed state, the upper and lower doors 91, 92 block the apertures 83, 84 to prevent airflow through the channel 88. The doors 91, 92 are shaped and sealed to ensure the wing tip device 9 has aerodynamically-smooth upper and lower surfaces 9u, 9l. In this sense, the wing tip device 9 with the channel 88 closed, essentially acts in the manner of a conventional aerofoil surface. The channel 88 is maintained in the closed state when the wing tip device 9 is in the flight configuration, and also when it is moved into the load-alleviating configuration (see FIGS. 2a and 2c). If the channel 88 were also maintained in the closed state whilst the wing tip device 9 were being returned to the flight configuration, the motor 15 would have to be of a high load-capacity because it would have to be acting against aerodynamic forces urging the wing tip device 9 upwards about the hinge 11. The first embodiment of the invention seeks to mitigate this problem and enables the load-capacity of the motor to be reduced.

Referring now to FIG. 5, the channel 88 is configurable to an open state in which the doors 91, 92, are slid back into a slot (not shown) in the wing skin. In the open state airflow enters the lower aperture 84, flows freely from the underside of the wing tip device 9, through the channel 88, and out of the upper aperture 83 on the upper surface 9u. Streamlines are shown in FIG. 5 to illustrate this flow.

The channel 88 effectively separates the wing tip device 9 into a front portion 86 (upstream of the channel) and a rearward portion 87 (downstream of the channel). The interior wall 85 of the channel is curved such that the rear face 85' of the front portion is convex. This surface 85' therefore acts as an effective upper surface of an aerofoil formed by the front portion 86 (i.e. with relatively low pressure airflow passing over). The upper surface of the front portion 86 switches to acting as an effective lower surface of that aerofoil. Accordingly, the net aerodynamic force on the front portion (shown schematically by the large dashed arrow F in FIG. 5) acts in substantially the opposite direction to the net aerodynamic force when the channel is in the closed state. During flight, this creates a bending moment about the hinge 11 that urges the wing tip device 9 back towards the flight configuration, and allows the motor 15 to be of a relatively low load-capacity (and therefore relatively light and small).

In the first embodiment of the invention, the flow over the rearward portion 87 is disrupted in a manner that largely negates the creation of any aerodynamic lift force, but in other embodiments (not shown) it may be that the rearward portion is shaped to also generate a net aerodynamic force that also acts to urge the wing tip device towards the flight configuration.

In the first embodiment of the invention, a spoiler 93 is used in conjunction with the opening of the channel 88, create the necessary aerodynamic forces to urge the wing tip device 9 back to the flight configuration. As illustrated in FIG. 5, the spoiler is deployed when the channel is in the open state and disrupts the flow over the wing tip device 9 in that region. This tends to create a turbulent flow downstream of the spoiler and may assist in the creation of the net aerodynamic force F urging the wing tip device towards the flight configuration.

Figure 6:
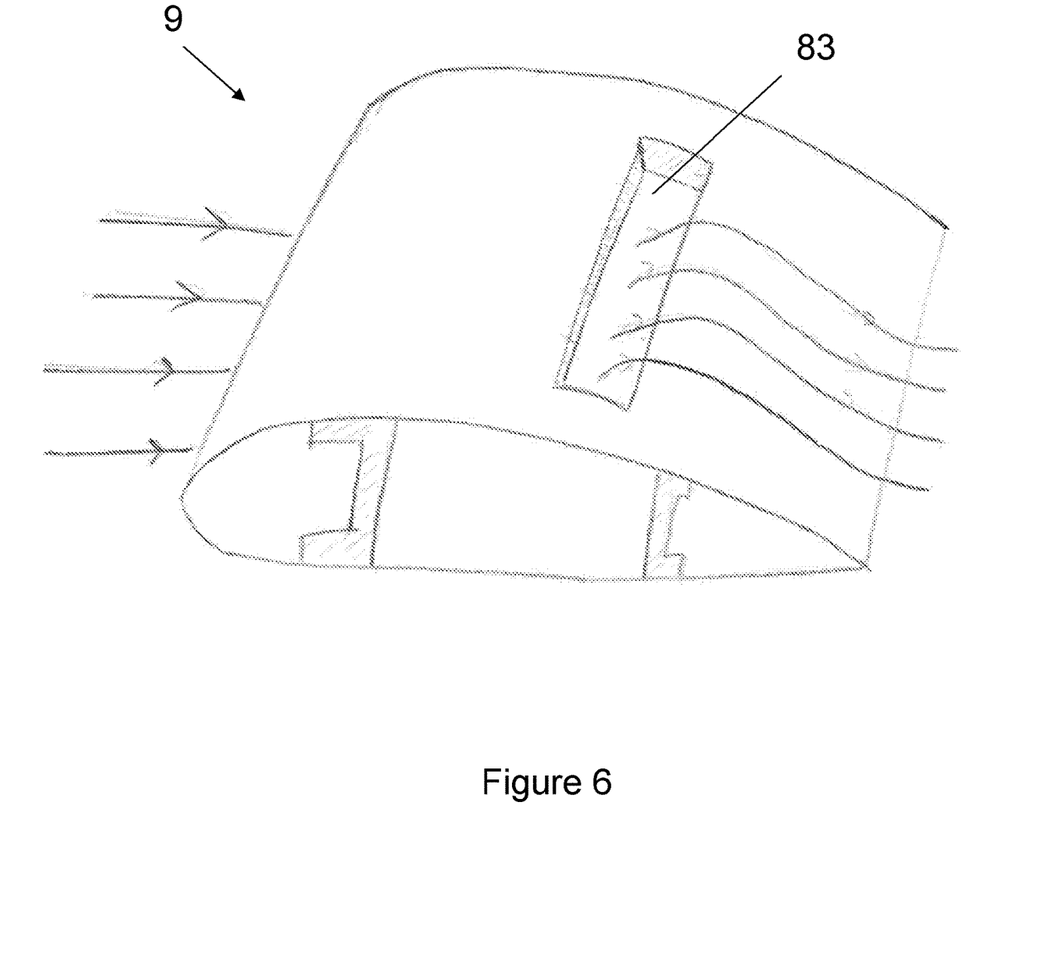
FIG. 6 is a perspective view showing the aperture on the upper surface of the wing tip device in the first embodiment of the invention.

FIG. 6 is s schematic perspective view showing the elongate form of the aperture 83 on the upper surface, together with some stream lines illustrating the flow from the underside of the wing tip device 9, through the channel 88 and exiting the aperture 83 on the upper surface. For clarity, some other features, such as the spoiler 93, are omitted from FIG. 6.

Figure 7:
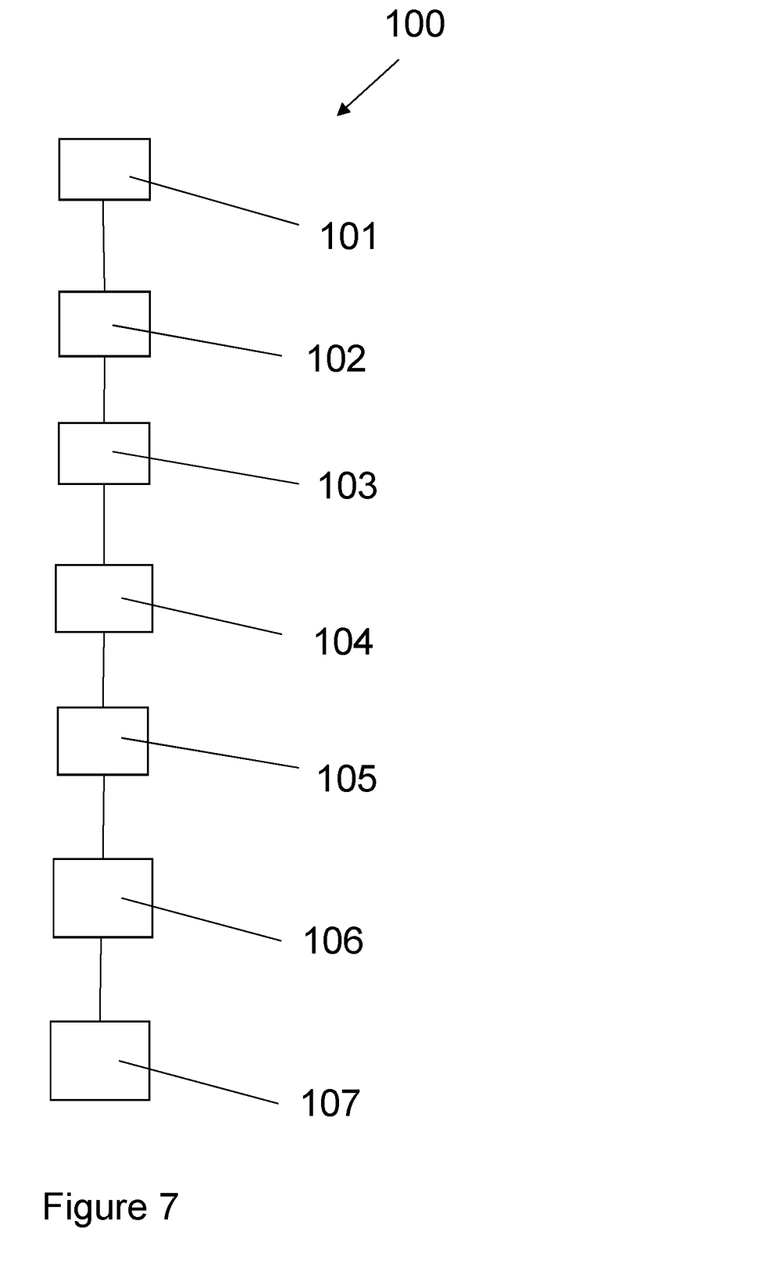
FIG. 7 is a flow chart showing a method of operating the wing tip device in FIGS. 1-6.

A method 100 involving moving the above-mentioned wing tip device 9 from a load-alleviating configuration to a flight configuration, will now be described with reference to FIG. 7. A processor receives 101 a signal from a sensor which indicates a high-load event, such as a gust. The processor transmits a signal to controller which releases the brake 19 (see FIG. 3), thereby permitting 102 movement of the wing tip device 9 to the load-alleviating configuration. Once in the load-alleviating configuration, the wing tip device is latched 103, thereby securing the wing tip device 9 in the load-alleviating configuration. In response to a signal indicative that the high-load condition has passed, the spoiler 93 is deployed and the doors 91, 92 are opened such that the channel 88 adopts the open state 104, and the wing tip device 9 is then unlatched 105. By virtue of the channel being in the opened state the aerodynamic loading on the wing tip device 9 urges the device back towards the flight configuration. In parallel, the motor 15 is also used to move 106 the wing tip device 9 to the flight configuration. Once in the flight configuration, the brake 19 is re-engaged, ensuring that the wing tip device 9 is in a restrained 106 configuration, the doors 91, 92 are closed to return the channel 88 to the closed state, and the spoiler 93 is retracted.

Figure 8:
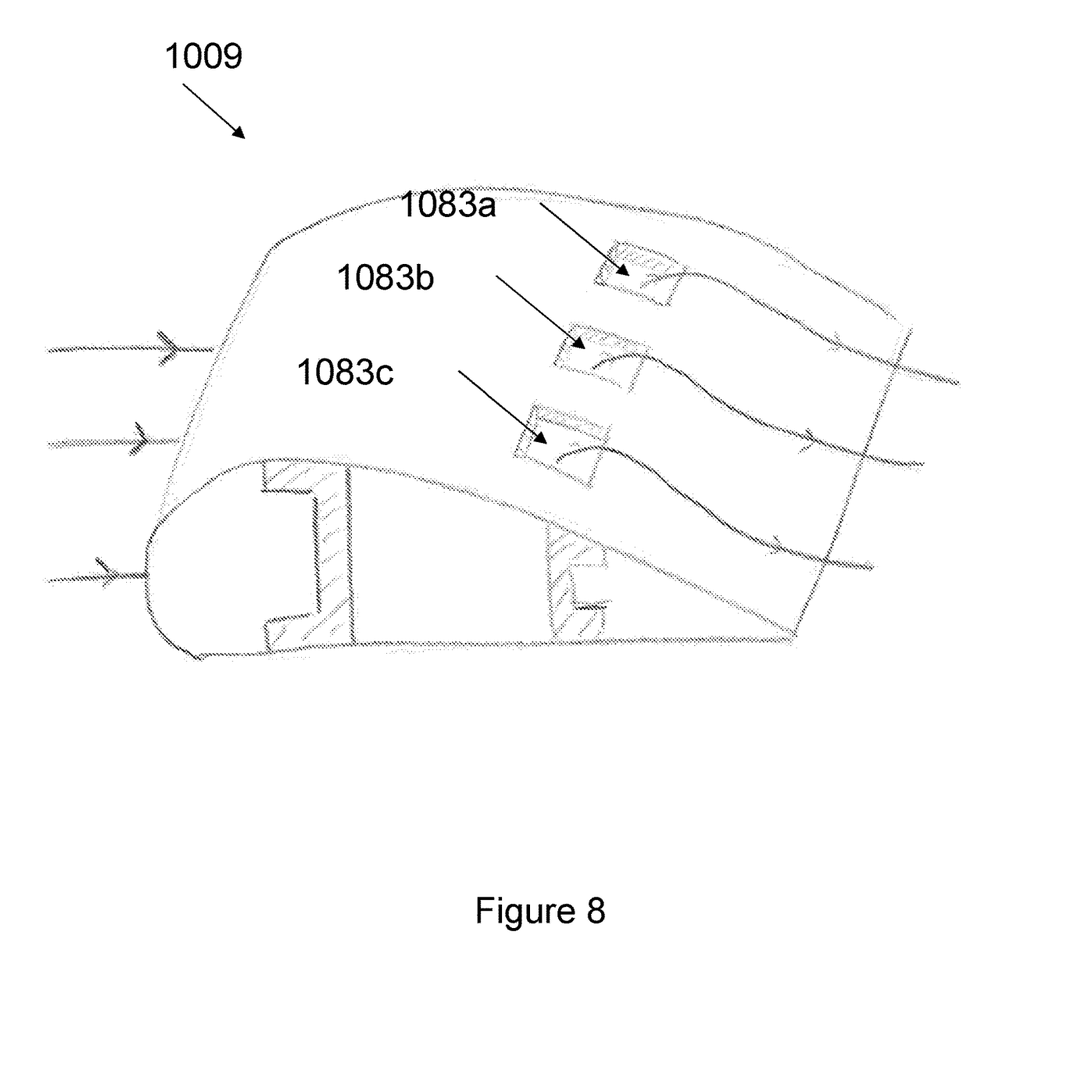
FIG. 8 is a similar perspective view to FIG. 6 but on a wing tip device in a second embodiment of the invention.
Figure 9:
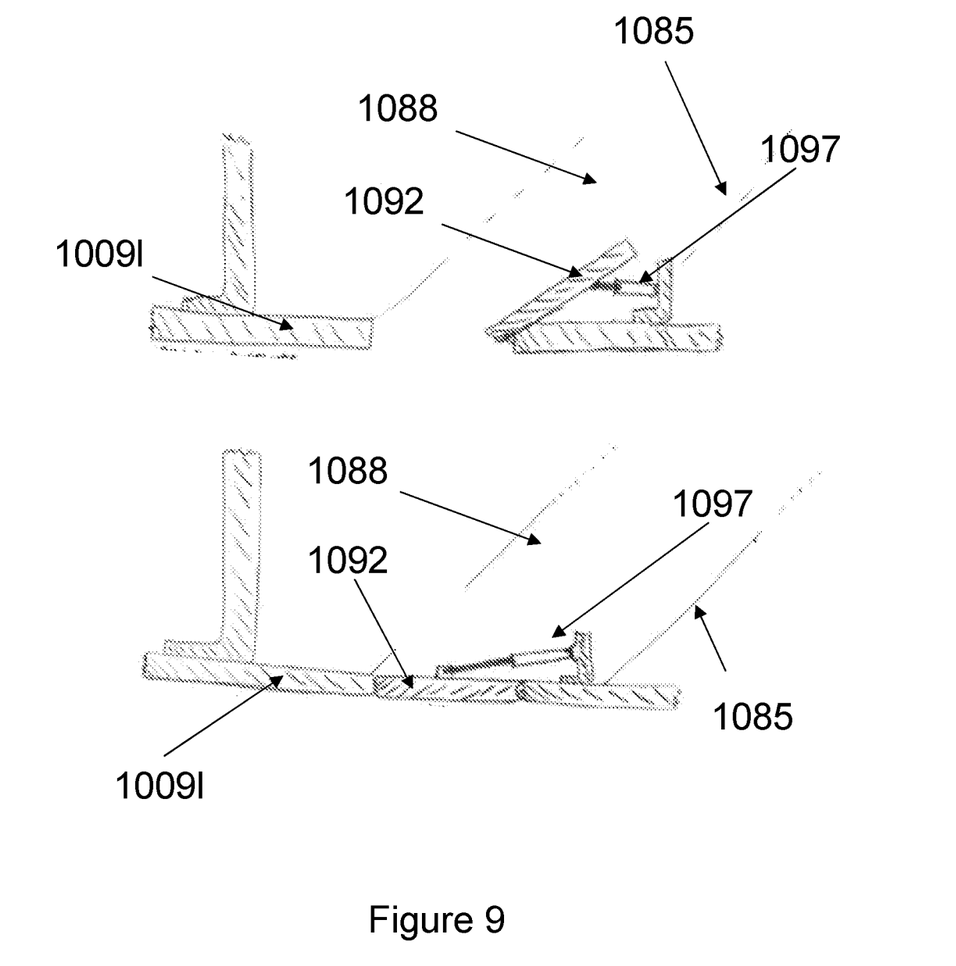
FIG. 9 is a close-up view showing a door in open and closed states in the wing tip device of FIG. 8.

FIGS. 8 and 9 illustrate a second embodiment of the invention. The second embodiment of the invention is broadly similar to the first embodiment expect for the features described below with reference to FIGS. 8 and 9. As shown in FIG. 8, the wing tip device 1009 comprises a series of apertures 1083a-1083c in the upper surface, rather than the single elongate opening 83 in the first embodiment. The lower surface of the wing tip device 1009 has a corresponding set of three apertures such that there are three channels for allowing airflow from the lower to the upper surfaces of the wing tip device 1009.

FIG. 8 is a close up view of one of the doors 1092 on the lower surface of the wing tip device. Rather than sliding into the wing skin, the door 1092 is hinged inwards and connected to a pivoted linear actuator 1097 such that when opened it lies substantially parallel to the rearward inner wall 1085 of the channel 1088 (see top image in FIG. 9).

Whilst the present invention has been described and illustrated with reference to particular embodiments, it will be appreciated by those of ordinary skill in the art that the invention lends itself to many different variations not specifically illustrated herein. By way of example only, certain possible variations will now be described:

Whilst the examples above use a restraining assembly as described in WO2017/118832, it will be appreciated that wing tip devices moveable in a different manner may also be used. Whilst in the examples above, the curved channel from lower to upper surface is used, other shapes of channel may be used to create the desired aerodynamic loading to urge the wing tip device back to the flight configuration. In some embodiments (not shown) there may be no actuator for moving the wing tip device from the load-alleviating configuration to the flight configuration; instead it may be that the channel is shaped such that during flight, when the channel is in the open configuration, the aerodynamic forces are sufficient to move the wing tip device 9 from the load-alleviating configuration to the flight configuration without any actuator at all.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. An aircraft comprising a wing, the wing having a fixed wing and a wing tip device moveably mounted to the fixed wing, wherein the wing tip device is movable from:
   (a) a load-alleviating configuration in which the wing tip device is oriented relative to the fixed wing such that at least one of an upper surface and a lower surface of the wing tip device is positioned away from a corresponding upper or lower surface of the fixed wing, to
   (b) a flight configuration in which the upper and lower surfaces of the wing tip device are continuations of the upper and lower surfaces, respectively, of the fixed wing,
   wherein the wing tip device comprises an airflow channel extending between respective apertures on the upper surface and lower surface of the wing tip device, and wherein the airflow channel is configurable between:
   (i) an open state which is configured to allow airflow through the channel from one of the upper surface or the lower surface of the wing tip device to the respective one of the upper surface or the lower surface of the wing tip device, via the apertures, and
   (ii) a closed state in which the airflow through the channel, via the apertures, is blocked,
   the channel being configured such that when the wing tip device is in the load-alleviating configuration and the channel is in the open state, the aerodynamic loading on the wing tip device in flight urges the wing tip device towards the flight configuration.

2. The aircraft according to claim 1 wherein when the channel is configured such that in the open state, the airflow flows through the channel from the lower surface of the wing tip device to the upper surface of the wing tip device.

3. The aircraft according to claim 1, wherein the aperture on the upper surface is downstream of the aperture on the lower surface.

4. The aircraft according to claim 1, wherein the airflow channel comprises an interior wall, to define a conduit extending between the apertures, and wherein the interior wall is shaped such that when the channel is in the open state, the aerodynamic loading on the wing tip device in flight urges the wing tip device towards the flight configuration.

5. The aircraft according to claim 4, wherein the interior wall is contoured to create a relatively low pressure airflow flow through the channel compared to a relatively high pressure airflow over the upper surface of the wing tip device.

6. The aircraft according to claim 5, wherein the channel separates the wing tip device into a forward portion, upstream of the channel, and a rearward portion downstream of the channel, and the channel is configured such that when the wing tip device is in the load-alleviating configuration and the channel is in the open state, the airflow around the forward portion in flight, creates an aerodynamic force urging the wing tip device towards the flight configuration.

7. The aircraft according to claim 1, wherein the wing tip device further comprises a first door and second door, each door being operable to selectively open or close a respective aperture on the upper or lower surface of the wing tip device, to switch the channel between the open and closed states.

8. The aircraft according to claim 1, wherein the wing tip device further comprises a deployable spoiler for deploying when the channel is in the open state, such that when the wing tip device is in the load-alleviating configuration, the channel is in the open state and the spoiler is deployed, the aerodynamic loading on the wing tip device in flight urges the wing tip device towards the flight configuration.

9. The aircraft according to claim 1, wherein the wing tip device is rotatably mounted on a hinge at the tip of the fixed wing, such that it may rotate, about the hinge, between the flight configuration and load-alleviating configuration.

10. The aircraft according to claim 9, wherein the aircraft comprises a restraining assembly operable between a restraining mode in which the wing tip device is held in the flight configuration using a restraining force, and a releasing mode in which the restraining force on the wing tip device is released, such that the wing tip device is able to adopt the load-alleviating configuration.

11. The aircraft according to claim 9, wherein the channel is configured such that when the wing tip device is in the load-alleviating configuration and the channel is in the open state, the aerodynamic loading on the wing tip device in flight, creates a bending moment about the hinge, thereby urging the wing tip device to rotate towards the flight configuration.

12. The aircraft according to claim 1, wherein the aircraft further comprises an actuator arranged to actuate the wing tip device from the load-alleviating configuration to the flight configuration, in conjunction with the aerodynamic forces on the wing tip device when the channel is in the open state, and wherein the actuator has a capacity of less than that required for moving the wing tip device when the channel is in the closed state.

13. A wing tip device for use as a the wing tip device on the aircraft of claim 1.

14. A method of returning a rotatably mounted wing tip device from a load-alleviating configuration, to a flight configuration,
   wherein the method comprises:
   configuring, when the wing tip device is in the load-alleviating configuration, the wing tip device from:
   (i) a closed state in which the airflow through a channel extending between apertures on the upper surface and lower surface of the wing tip device, is blocked, and
   (ii) an open state in which airflow through the channel, via the apertures, is permitted, such that the aerodynamic loading on the wing tip device in flight urges the wing tip device to rotate towards the flight configuration.

15. A rotatably mounted wing tip device configured to return from a load-alleviating configuration to a flight configuration under the action of aerodynamic forces in flight, the wing tip device comprising a conduit extending between respective openings on upper and lower surfaces of the wing tip device, and the conduit being configurable between:
   (i) a closed state in which the respective openings are blocked to prevent airflow through the conduit, and
   (ii) an open state in which the respective openings are exposed such that air may flow through the conduit from the lower surface of the wing tip device to the upper surface of the wing tip device such that the aerodynamic loading on the wing tip device in flight urges the wing tip device to rotate towards the flight configuration.

* * * * *